United States Patent
Butler et al.

(10) Patent No.: US 9,057,815 B2
(45) Date of Patent: Jun. 16, 2015

(54) ANGULAR ALIGNMENT OF OPTICAL FIBERS FOR FIBER OPTIC RIBBON CABLES, AND RELATED METHODS

(75) Inventors: Douglas L. Butler, Painted Post, NY (US); Micah C. Isenhour, Lincolnton, NC (US); Dennis M. Knecht, Hickory, NC (US); James P. Luther, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 330 days.

(21) Appl. No.: 13/485,192

(22) Filed: May 31, 2012

(65) Prior Publication Data

US 2013/0322835 A1  Dec. 5, 2013

(51) Int. Cl.
  G02B 6/44  (2006.01)
  G02B 6/02  (2006.01)
  G02B 6/38  (2006.01)

(52) U.S. Cl.
  CPC ....... G02B 6/02042 (2013.01); *Y10T 29/49895* (2015.01); *G02B 6/3885* (2013.01); G02B 6/4403 (2013.01)

(58) Field of Classification Search
  None
  See application file for complete search history.

(56) References Cited

U.S. PATENT DOCUMENTS

| 6,580,860 B1* | 6/2003 | Varner ........................ 385/123 |
| 2008/0282742 A1 | 11/2008 | Colgan et al. ................... 65/406 |
| 2010/0290750 A1 | 11/2010 | Imamura ....................... 385/126 |
| 2011/0129190 A1 | 6/2011 | Fini et al. ....................... 385/126 |
| 2012/0219255 A1 | 8/2012 | Bradley et al. .................. 385/78 |
| 2012/0251045 A1* | 10/2012 | Budd et al. ...................... 385/33 |

FOREIGN PATENT DOCUMENTS

| WO | WO 92/04719 A1 | 3/1992 | ............... H01B 7/08 |
| WO | WO 2011/116137 A1 | 9/2011 | ............... G02B 6/40 |

OTHER PUBLICATIONS

Patent Cooperation Treaty, International Search Report and Written Opinion for International Application No. PCT/US2013/043262; Mailing Date Feb. 28, 2014—14 pages.

\* cited by examiner

*Primary Examiner* — Tina Wong

(57) ABSTRACT

Angular alignment of optical fibers for fiber optic ribbon cables and related methods are disclosed. Employing optical fibers disposed in a ribbon matrix can increase bandwidth between two interconnection points. In one embodiment, optical fibers are angularly aligned during the process of forming a fiber optic ribbon cable. To angularly align the optical fibers, each of the optical fibers include an angular alignment feature to facilitate uniform or substantially uniform angular orientation along a cable when the optical fibers are prepared to be disposed in the ribbon matrix to form a fiber optic ribbon cable. By purposefully aligning the optical fibers during formation of the fiber optic ribbon cable, end portions of the optical fibers are aligned in the ribbon matrix. Thus, end portions of the ribbon matrix are not required to be removed to expose and align the end portions of optical fibers when the ribbon cable is connectorized.

19 Claims, 10 Drawing Sheets

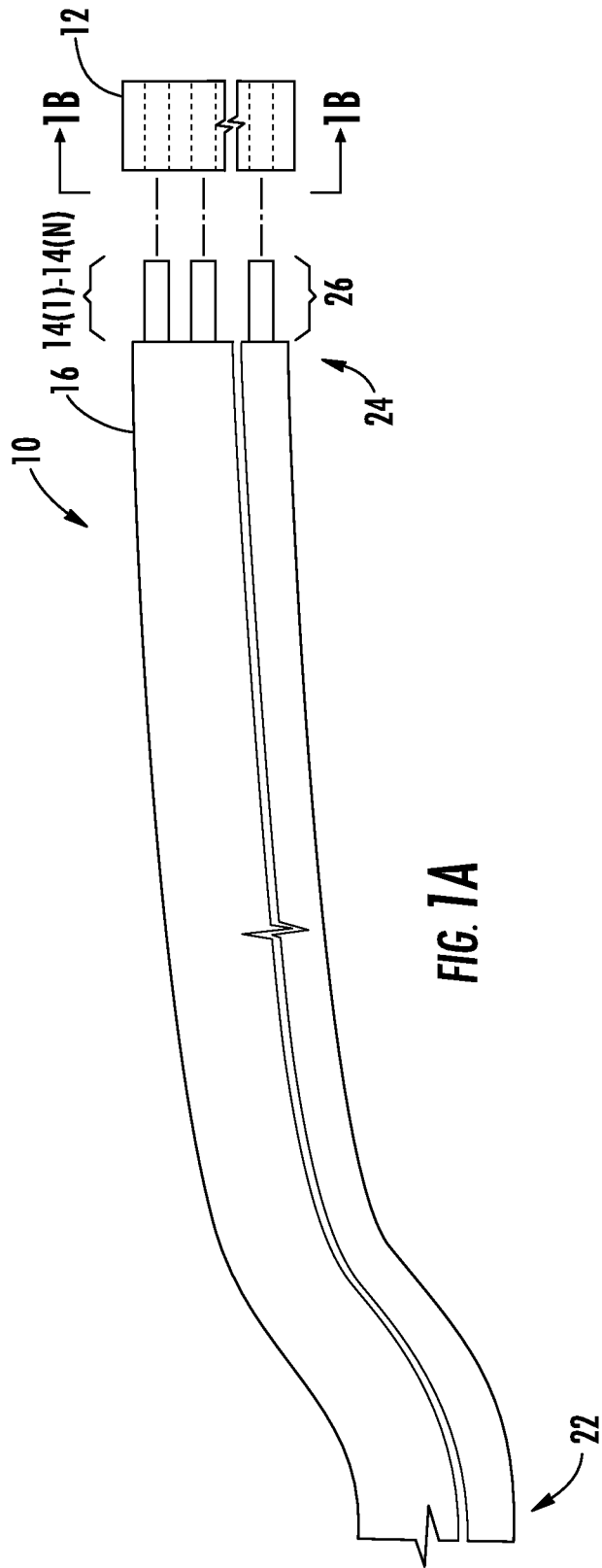
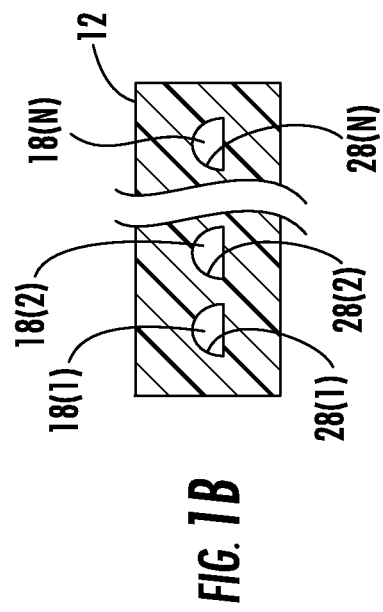
FIG. 1A
FIG. 1B

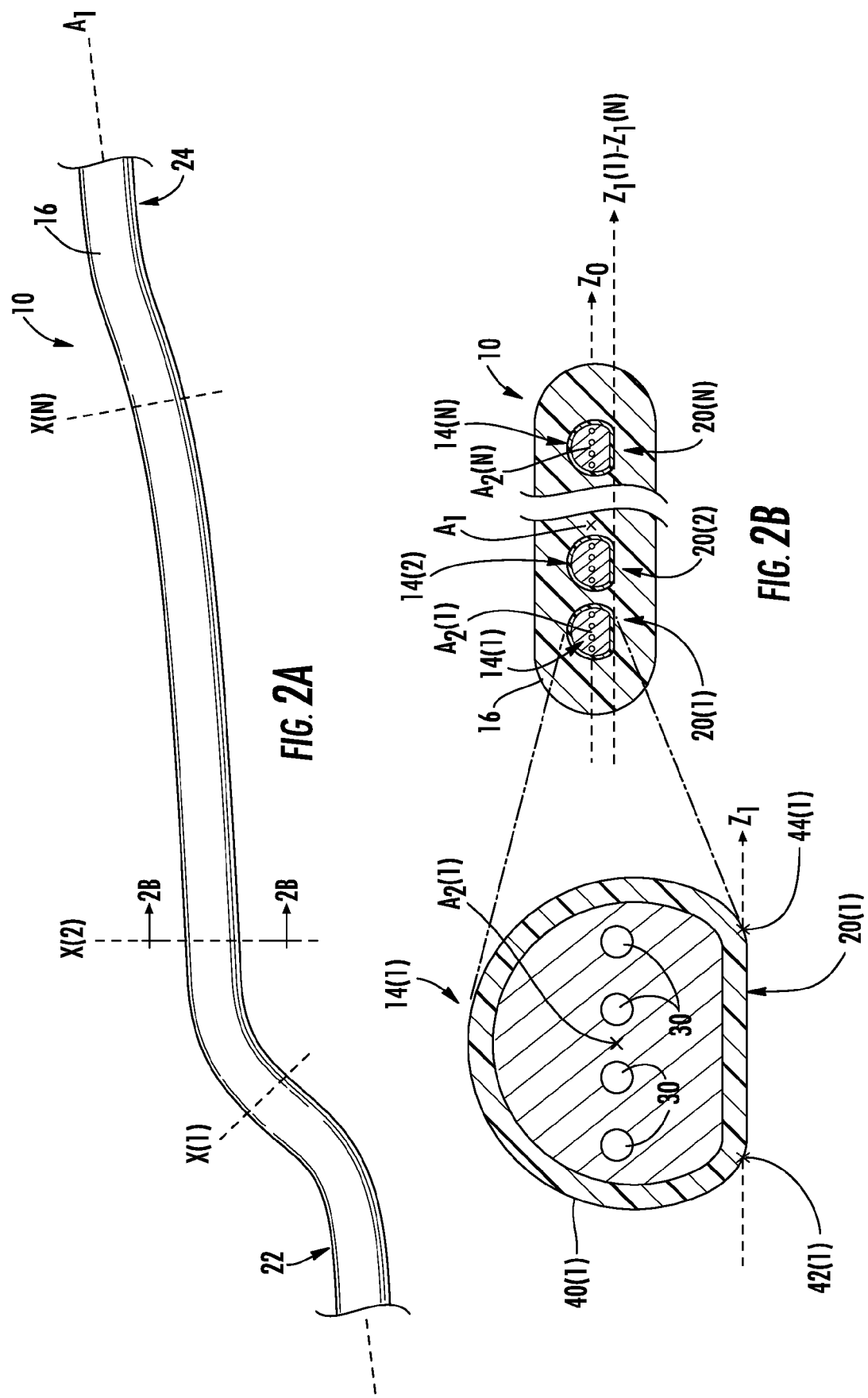

ANGULAR ALIGNMENT OF OPTICAL FIBERS FOR FIBER OPTIC RIBBON CABLES, AND RELATED METHODS

BACKGROUND

1. Field of the Disclosure

The technology of the disclosure relates to fiber optic ribbon cables comprising multiple optical fibers disposed in a ribbon matrix to support multiple optical pathways.

2. Technical Background

Benefits of optical fibers include extremely wide bandwidth and low noise operation. In cases where high bandwidth is required between two interconnection locations, fiber optic cables may be used to provide sufficient bandwidth to communicate information between these locations.

In cases where greater optical interconnect density is required with multiple connection points in a small area, fiber optic ribbon cables may be used. Fiber optic ribbon cables provide multiple optical fibers disposed in parallel in a cable. As demand for higher bandwidth increases, interconnection technologies must accommodate more optical fibers or adapt other techniques to provide more bandwidth, for example, multicore optical fibers. At each of the interconnection locations, the end of each optical fiber must be precisely aligned with optical components to exchange optical information or unacceptable signal attenuation may occur. Optical fibers are typically optically coupled at the interconnection location using fiber optic connectors which enable efficient connection and disconnection of the optical fibers at interconnection locations.

Conventional connectors utilized with commercially-available single-core optical fibers use passive alignment or active alignment to ensure that the single-core optical fibers are properly located within the connector. Passive alignment allows an end of the single-core optical fiber to be inserted into a precisely-shaped circular opening of a ceramic ferrule to align the single core, which includes a single optical path, to a center of the circular opening. The passive alignment used for single-core optical fibers is not sufficient to align multicore optical fibers, because angular orientation is also required for alignment. Specifically, when a multicore optical fiber is inserted into an opening of a ferrule, not every core (including an optical path) of the multicore optical fiber will be located at a center of the opening of the ferrule. Precise angular orientation of each of the multicore optical fibers within the ferrule is required for alignment to a fiber optic connector. Conventional fiber optic connectors for single-mode optical fibers using passive alignment techniques do not align optical fibers in accordance with angular orientation and thereby are unsuitable for multicore optical fibers.

Alternatively, active alignment is the customized placement of an end of an optical fiber at an interconnect point in terms of X, Y, and Z coordinates and also angular alignment, depending on optical fiber type, to meet the optical transmission requirements of the optical fiber at that interconnection point. Active alignment typically requires time-consuming optical diagnostic equipment to ensure that each optical fiber is properly orientated within the connector before being fixed into place. In this regard, multicore optical fibers are even more difficult and time consuming to actively align compared to single-mode optical fibers given the additional requirement of angular alignment.

Regardless of whether passive or active alignment techniques are used, connecting multiple multicore optical fibers combined in a ribbon cable provides additional problems because the inefficiencies of each of the alignment techniques are accumulated. A ribbon cable includes multiple optical fibers orientated in parallel and connected by a ribbon matrix (or outer cable jacket) holding the optical fibers together. Each optical fiber must be aligned to the connector. Specifically, to actively align a multicore optical fiber in a ribbon cable, a ribbon matrix (the outer cable jacket) may have to be substantially removed or "cut back" in order to free optical fibers needing large angular adjustments to complete alignment at an interconnection point. Cutting back the ribbon matrix may be infeasible because substantial cutting of fiber optic ribbon cables is overly time consuming. Moreover substantially removing the ribbon matrix ("cutting back") exposes portions of the optical fibers to damage. In this regard, improved approaches are needed to provide a high density of easily connectorized optical paths in a cost effective manner.

SUMMARY OF THE DETAILED DESCRIPTION

Embodiments disclosed herein include angular alignment of optical fibers for fiber optic ribbon cables and related methods. Multiple optical fibers disposed in parallel in a ribbon matrix may be used to increase bandwidth between two interconnection points. In this regard, optical fibers are angularly aligned during the process of forming a fiber optic ribbon cable. To angularly align the optical fibers, each of the optical fibers may include an angular alignment feature. The angular alignment feature facilitates uniform or substantially uniform angular orientation along a cable center axis of each of the optical fibers when the optical fibers are prepared to be disposed in the ribbon matrix to form a fiber optic ribbon cable. The uniform or substantially uniform angular orientation may facilitate alignment of each of the optical fibers as part of a process to optically connect each of these optical fibers precisely to a fiber optic connector. The optical fibers are held in angular alignment when provided in the ribbon matrix.

By purposefully aligning the optical fibers along their length during the formation of the fiber optic ribbon cable, the end portions of the optical fibers are aligned in the ribbon matrix. Thus, end portions of the ribbon matrix are not required to be removed (e.g., stripped or cut back) to expose and align the end portions of optical fibers when the ribbon cable is connectorized. Removing the end portions of the ribbon matrix incurs additional manufacturing labor and time, and associated expense. Also, having to expose lengths of the end portions of the optical fibers from the ribbon matrix for alignment can provide a greater risk damaging the optical fibers during connectorization.

In this regard in one embodiment, a fiber optic ribbon cable is provided. The fiber optic ribbon cable may include a plurality of optical fibers comprising a first end and a second end. The fiber optic ribbon cable may also include a ribbon matrix attached to each of the plurality of optical fibers. The ribbon matrix may extend from the first end to the second end. Each of the plurality of optical fibers may include an angular alignment feature extending from the first end to the second end. Each of the plurality of optical fibers may be disposed with a substantially uniform angular orientation of the angular alignment features from the first end to the second end of the optical fibers. In this manner, as a non-limiting example, providing angular alignment of optical fibers relative to one another in the fiber optic ribbon cable may be less expensive relative to conventional active alignment techniques involving substantially removing the ribbon matrix.

In another embodiment, a method for manufacturing a fiber optic ribbon cable is provided. The method includes providing a plurality of optical fibers. Each of the plurality of optical fibers includes an angular alignment feature extending from a first end of the plurality of optical fibers to a second end of the plurality of optical fibers. The method also includes aligning each of the plurality of optical fibers with respect to the angular alignment feature to provide uniform or substantially uniform angular orientation of each of the plurality of optical fibers downstream of an alignment surface to form a plurality of aligned optical fibers. The method further includes applying a ribbon matrix to the plurality of aligned optical fibers to produce a plurality of ribbonized optical fibers each comprising the uniform or substantially uniform angular orientation. In this manner, as a non-limiting example, the fiber optic ribbon cable may be adapted for passive alignment to a connector to avoid the time intensive process active alignment and substantially removing the ribbon matrix.

In another embodiment, a fiber optic ribbon cable is provided. The fiber optic ribbon cable may include a plurality of optical fibers. Each of the plurality of optical fibers may include a first end and a second end. Each of the plurality of optical fibers may also include an angular alignment feature extending from the first end to the second end. The angular alignment features may be formed as a portion of the external surface of the plurality of optical fibers. The fiber optic ribbon cable may also include ribbon matrix attached to each of the plurality of optical fibers with a ribbon die coating head. The ribbon matrix may be attached after each of the plurality of optical fibers may be aligned by abutting against an alignment surface. The ribbon matrix may extend from the first end of the optical fibers to the second end. Each of the plurality of optical fibers may be disposed with a substantially uniform angular orientation of the angular alignment features from the first end to the second end. In this manner, as a non-limiting example, the fiber optic ribbon cable may be optically coupled to a ferrule efficiently at an interconnection location. In this manner, as a non-limiting example, the fiber optic ribbon cable may provide multiple optical paths with less attenuation.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1A is an exemplary fiber optic ribbon cable having optical fibers being passively aligned into a ferrule of a fiber optic connector;

FIG. 1B is a front view of the ferrule of FIG. 1A;

FIGS. 2A and 2B are a perspective view and a cross-sectional view of the fiber optic ribbon cable of FIG. 1A, including optical fibers with an angular alignment feature comprising a planar surface;

DETAILED DESCRIPTION

Figure 3:
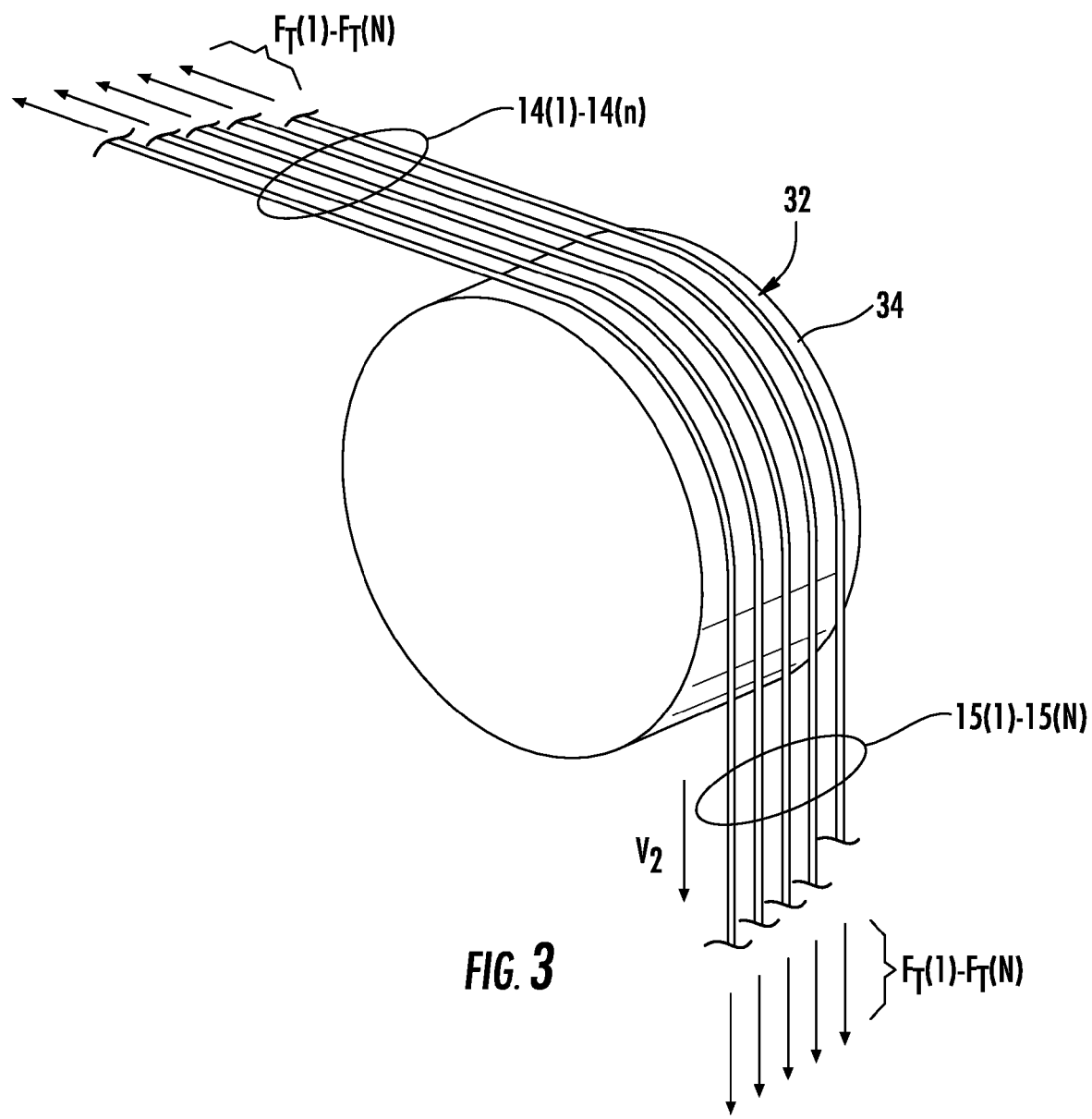
FIG. 3 is a perspective view of an alignment surface used to facilitate alignment of the angular alignment features of the optical fibers of the fiber optic ribbon cable of FIG. 1A.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include angular alignment of optical fibers for fiber optic ribbon cables and related methods. Multiple optical fibers disposed in parallel in a ribbon matrix may be used to increase bandwidth between two interconnection points. In this regard, optical fibers are angularly aligned during the process of forming a fiber optic ribbon cable. To angularly align the optical fibers, each of the optical fibers may include an angular alignment feature. The angular alignment feature facilitates uniform or substantially uniform angular orientation along a cable center axis of each of the optical fibers when the optical fibers are prepared to be disposed in the ribbon matrix to form a fiber optic ribbon cable. The uniform or substantially uniform angular orientation may facilitate alignment of each of the optical fibers as part of a process to optically connect each of these optical fibers precisely to a fiber optic connector. The optical fibers are held in angular alignment when provided in the ribbon matrix.

By purposefully aligning the optical fibers along their length during the formation of the fiber optic ribbon cable, the end portions of the optical fibers are aligned in the ribbon matrix. Thus, end portions of the ribbon matrix are not required to be removed (e.g., stripped or cut back) to expose and align the end portions of optical fibers when the ribbon cable is connectorized. Removing the end portions of the ribbon matrix incurs additional manufacturing labor and time, and associated expense. Also, having to expose lengths of the end portions of the optical fibers from the ribbon matrix for alignment can provide a greater risk damaging the optical fibers during connectorization.

In this regard, FIG. 1A shows an exemplary fiber optic ribbon cable 10 adapted for a passive alignment with a ferrule 12 of a fiber optic connector (not shown). The fiber optic ribbon cable 10 includes optical fibers 14(1)-14(N) embedded within a ribbon matrix 16 and angularly aligned to be precisely received into orifices 18(1)-18(N) of the ferrule 12 respectively as shown in FIG. 1B. As will be discussed in more detail below, the optical fibers 14(1)-14(N) contain angular alignment features 20(1)-20(N) (FIG. 2B) that facilitate alignment of the optical fibers 14(1)-14(N) to enable the fiber optic ribbon cable 10 to be more efficiently optically coupled at an interconnect location, for example where the ferrule 12 of a fiber optic connector may be located.

The fiber optic ribbon cable 10 may extend at least from a first end 22 to a second end 24. The fiber optic ribbon cable 10 may extend, for example, more than a kilometer between the first end 22 and the second end 24, to decrease manufacturing cost through economies of scale. The ribbon matrix 16 has been cut back at the second end 24 of the fiber optic ribbon cable 10 to expose a portion 26 of the optical fibers 14(1)-14(N). The portion 26 of the optical fibers 14(1)-14(N) may be received by orifices 18(1)-18(N) of the ferrule 12. The ferrule 12 may be part of a fiber optic connector (not shown) and used within a process called passive alignment. In passive alignment, the optical fibers 14(1)-14(N) may be precisely aligned by abutting mechanical interfaces of the ferrule 12. Here, as shown in FIG. 1B, the mechanical interfaces are inner surfaces 28(1)-28(N) forming the orifices 18(1)-18(N). Passive alignment is generally preferable than active alignment where ends of optical fibers are precisely moved in three axes (X, Y, and Z) to perform an individual alignment of each optical fiber at an interconnection location using time-consuming optical diagnostic equipment before attaching the aligned optical fiber at the interconnection location.

Passive alignment of optical fibers 14(1)-14(N) of the fiber optic ribbon cable 10 may be possible if the optical fibers 14(1)-14(N) are angularly aligned within the ribbon matrix 16. Passive alignment may not be feasible when the optical fibers 14(1)-14(N) are not within a specific angular orientation. The angular orientation for each of the optical fibers must be maintained all along a length of the fiber optic ribbon cable 10 when manufactured to enable passive alignment at any cross-section required along the length.

To further describe the angular alignment of the optical fibers 14(1)-14(N) using the angular alignment features 20(1)-20(N) provided on the optical fibers 14(1)-14(N), FIGS. 2A and 2B are provided. FIGS. 2A and 2B are perspective and cross-sectional views of the fiber optic ribbon cable 10. Each of the optical fibers 14(1)-14(N) of the fiber optic ribbon cable 10 shown in FIGS. 2A-2B may comprise, for example, a multicore optical fiber including optical cores 30. Each of the optical cores 30 may be configured to accommodate different optical paths and thereby increase bandwidth of the fiber optic ribbon cable 10. As there may not be merely a single optical core 30 at each fiber center axis $A_2(1)$-$A_2(N)$ of the optical fibers 14(1)-14(N) respectively when multicore optical fibers are utilized, angular orientation of each of the optical fibers 14(1)-14(N) may be important when aligning to the ferrule 12. If any of the optical fibers 14(1)-14(N) are angularly misaligned at the ferrule 12, then optical coupling at the ferrule 12 may be unsuccessful.

As shown in FIG. 2B, a cross section X(2) may include a portion of each of the plurality of optical fibers 14(1)-14(N), and the portions of each of the optical fibers 14(1)-14(N) may be disposed in a geometric line (represented by vector $Z_O$) within the cross-section X(2). Including portions of each optical fiber 14(1)-14(N) at the cross section X(2) allows for any of these optical fibers 14(1)-14(N) to be available for passive alignment to the ferrule 12 at this cross section X(2).

FIG. 2B shows an angular alignment feature 20(1)-20(N) of each of the optical fibers 14(1)-14(N) respectively. Each of the angular alignment features 20(1)-20(N) may be used to align the optical fibers 14(1)-14(N) by abutting against an alignment surface 32 as shown in FIG. 3. The angular alignment features 20(1)-20(N) facilitate the optical fibers 14(1)-14(N) to also become aligned optical fibers 15(1)-15(N) when engaged with the alignment surface 32. The alignment may occur by applying tensile forces $F_T(1)$-$F_T(N)$ on the optical fibers 14(1)-14(N) respectively to thereby engage the alignment surface 32. The alignment surface 32 may include, for example, a convex surface 34 (FIG. 3). The convex surface 34 permits the optical fibers 14(1)-14(N) to engage with and disengage from the alignment surface 32 in a predictable and gradual manner.

Figure 4A:
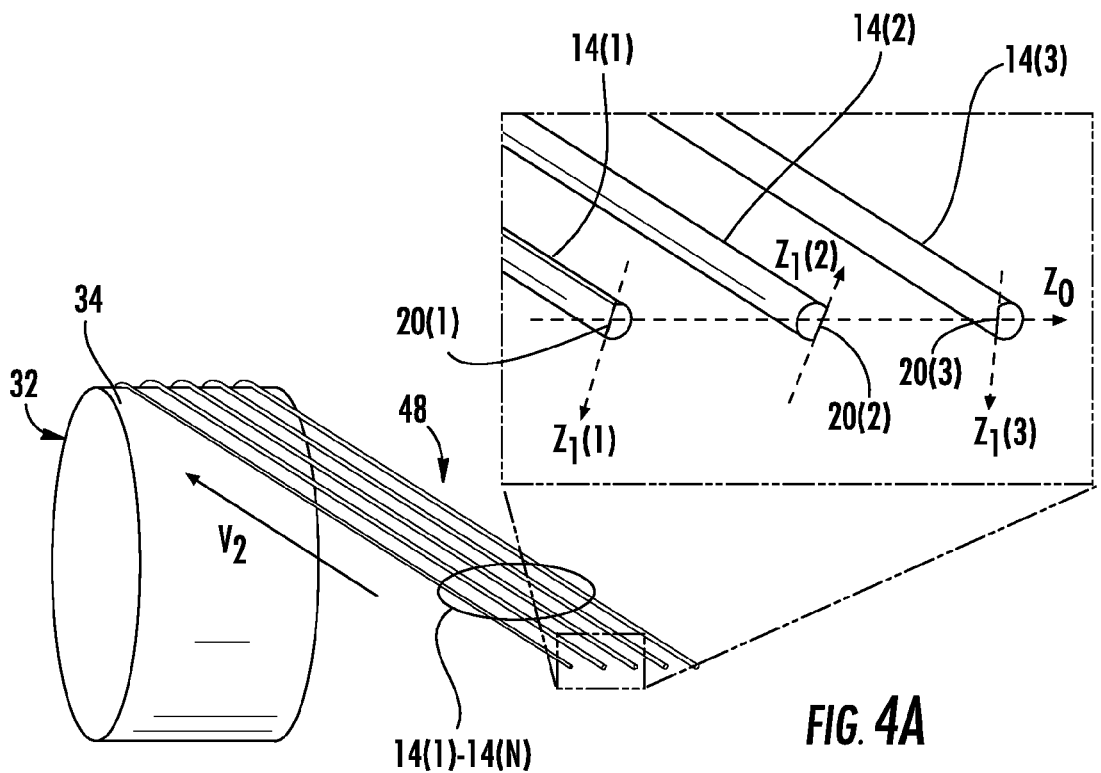
FIG. 4A is a perspective view of details of the optical fibers approaching the alignment surface of FIG. 3 before being aligned by the alignment surface.
Figure 4B:
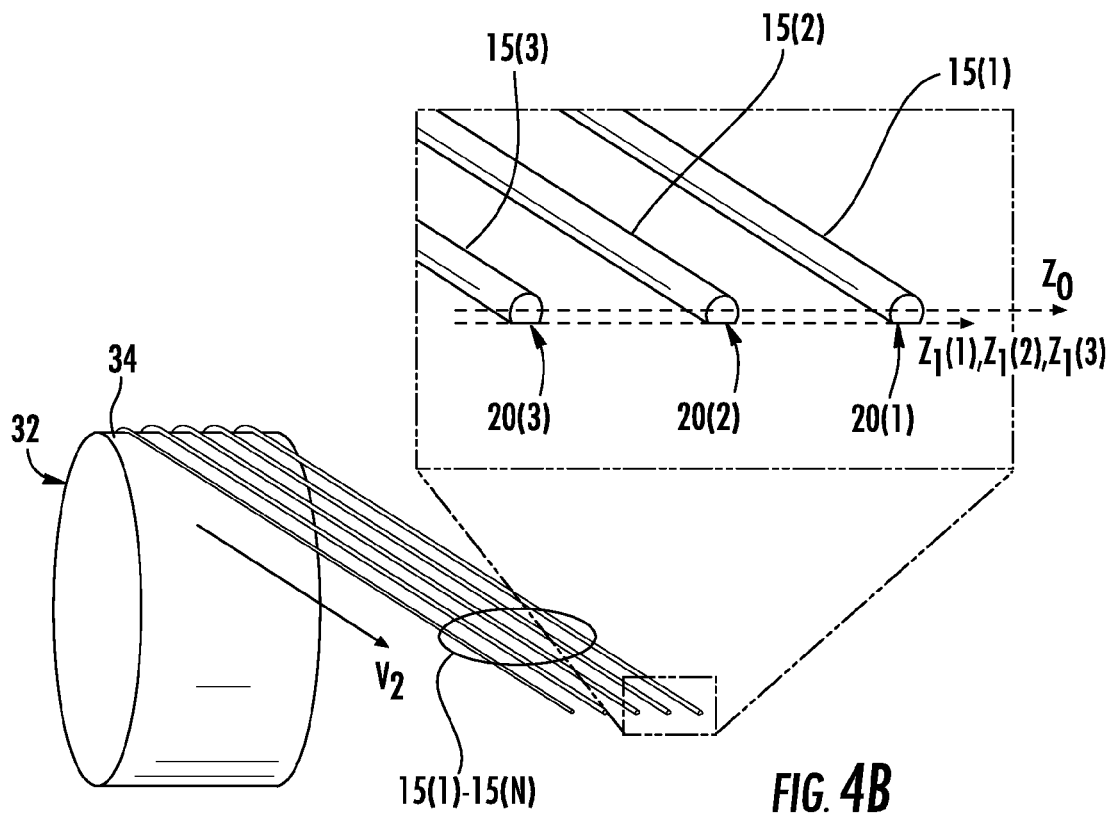
FIG. 4B is a perspective view of details of the optical fibers departing the alignment surface of FIG. 3 in a uniform or substantially uniform angular alignment.

FIGS. 4A and 4B show the effectiveness of the alignment surface 32 on the angular alignment of the optical fibers 14(1)-14(N). As shown in FIG. 4A, the optical fibers 14(1)-14(N) approach the alignment surface 32 with a velocity $V_2$ and random angular orientation as represented by angular vectors $Z_1(1)$-$Z_1(N)$ pointing in different directions. FIG. 4B shows the optical fibers 14(1)-14(N) departing from the alignment surface 32 with the angular vectors $Z_1(1)$-$Z_1(N)$ aligned in the same direction and ready to be fixed in this aligned angular position by the ribbon matrix 16 (FIG. 2B). As such, each of the optical fibers 14(1)-14(N) may be disposed with a uniform or substantially uniform angular orientation of the angular alignment features 20(1)-20(N) from the first end 22 to the second end 24 of the optical fibers 14(1)-14(N). Once the ribbon matrix 16 may be attached to the optical fibers 14(1)-14(N), the optical fibers 14(1)-14(N) are aligned and ready for passive alignment with the ferrule 12. The inefficiencies related to active alignment and substantial cut back of the ribbon matrix 16 may thereby be avoided.

Passive alignment of the fiber optic ribbon cable 10 and the concept of the alignment surface 32 to align the optical fibers 14(1)-14(N) of the fiber optic ribbon cable 10 have been introduced. Now the details of the fiber optic ribbon cable 10 will be discussed before details of the alignment surface 32 and its use.

With reference back to FIGS. 2A and 2B, the fiber optic ribbon cable 10 may include a plurality of optical fibers 14(1)-14(N) and the ribbon matrix 16, both extending from the first end 22 to the second end 24 along a cable center axis $A_1$. The plurality of optical fibers 14(1)-14(N) may include fiber center axes $A_2(1)$-$A_2(N)$, respectively, which may be parallel to the cable center axis $A_1$. The number N (or quantity) of optical fibers 14(1)-14(N) may depend on the application, and although at least three (3) are shown in FIG. 1B it is noted that two (2) are also possible but not shown.

The optical fibers 14(1)-14(N) may be attached to each other through the ribbon matrix 16. The ribbon matrix 16 may be made of a strong, flexible material, for example, a polyurethane acrylate resin commercially available from DSM Desotech Inc. of Elgin, Ill.

Figure 5:
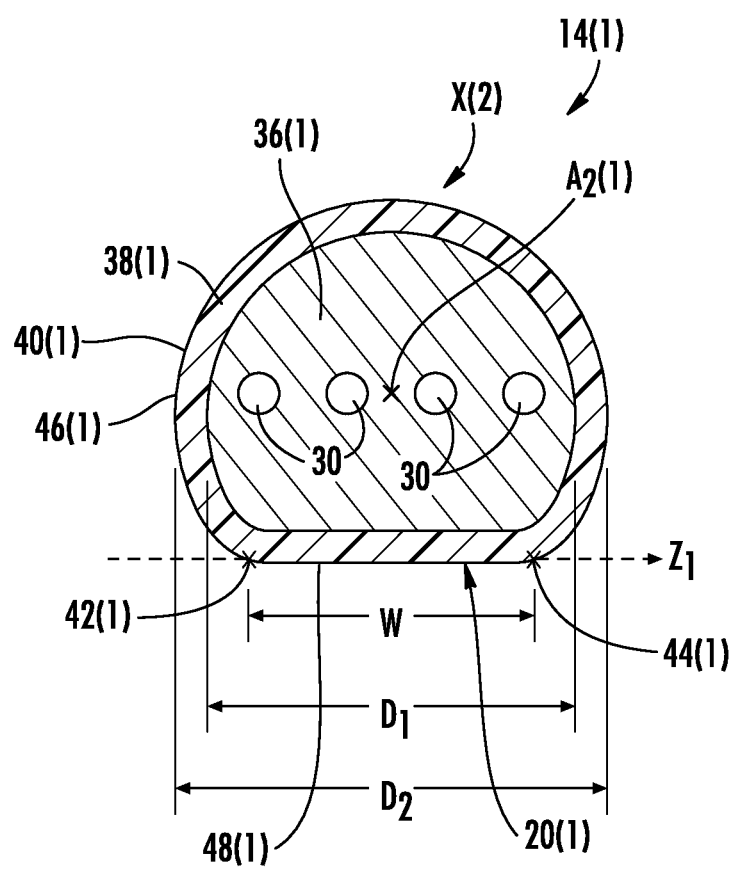
FIG. 5 is a cross-sectional view of details of the optical fibers disposed in alignment in the fiber optic ribbon cable of FIG. 2B.

FIG. 5 depicts the cross-section X(2) of optical fiber 14(1) which also may represent optical fibers 14(1)-14(N) to simplify discussion herein. It is noted that this cross-section X(2) may be orthogonal to the fiber center axis $A_2(1)$. The optical fibers 14(1)-14(N) may include bare optical fibers 36(1)-36(N) and primary coatings 38(1)-38(N), respectively. The primary coatings 38(1)-38(N) may surround the bare optical fibers 36(1)-36(N) to form external surfaces 40(1)-40(N) of the optical fibers 14(1)-14(N), respectively. The bare optical fibers 36(1)-36(N) may comprise a strong material with excellent optical properties, for example, silica glass. The primary coatings 38(1)-38(N) may prevent surface abrasions from forming on the bare optical fibers 36(1)-36(N). Surface abrasions may be created when the bare optical fibers 36(1)-36(N) contact other objects, for example, the alignment surface 32. The surface abrasions may weaken the bare optical fibers 36(1)-36(N) and thereby damage or break the bare optical fibers 36(1)-36(N). The primary coatings 38(1)-38(N) prevent surface abrasions from being created and thereby protect the bare optical fibers 36(1)-36(N). The primary coatings 38(1)-38(N) may comprise, for example, ultra-violet (UV) curable acrylate.

With continuing reference to FIG. 5, details and significance of the cross-sectional shape of the optical fibers 14(1)-14(N) will be discussed. Each of the optical fibers 14(1)-14(N) may be formed with the external surface 40(1)-40(N) generally disposed around the center axis $A_2(1)$-$A_2(N)$ respectively. The optical fibers 14(1)-14(N) may each include the angular alignment feature 20(1)-20(N), respectively, extending from the first end 22 to the second end 24 to ensure alignment along a length of the fiber optic ribbon cable 10.

It is noted that the primary coatings 38(1)-38(N) may be relatively thin, for example five (5) to ten (10) microns, in order to not obscure a contribution of the bare optical fibers 36(1)-36(N) to the angular alignment features 20(1)-20(N) when engaging the alignment surface 32 and thereby "blur" or make less effective the alignment of the optical fibers 14(1)-14(N) at the alignment surface 32.

Each of the angular alignment features 20(1)-20(N) may be aligned parallel to the cable center axis $A_1$ and extend from a first transition point 42(1)-42(N) to a second transition point 44(1)-44(N) along a portion of the external surfaces 40(1)-40(N) of the optical fibers 14(1)-14(N). The first transition point 42(1)-42(N) and the second transition point 44(1)-44(N) provide stability to the alignment process by preventing the angular alignment feature 20(1)-20(N) from disengaging from the alignment surface 32.

A concentric portion 46(1)-46(N) of the external surfaces 40(1)-40(N), not containing the angular alignment feature 20(1)-20(N), may be generally be concentric to the fiber center axis $A_2(1)$-$A_2(N)$. The concentricity permits the optical fiber 14(1)-14(N) to more easily turn upon the alignment surface 32 towards the angular alignment features 20(1)-20(N) respectively. It is noted that the angular alignment features 20(1)-20(N) are closer to the fiber center axis $A_2(1)$-$A_2(N)$ of each optical fiber 14(1)-14(N) than the concentric portion 46(1)-46(N). As such, each of the concentric portions 46(1)-46(N) of the optical fibers 14(1)-14(N) may rotate upon the alignment surface 32, but eventually the angular alignment features 20(1)-20(N) may engage and abut against the alignment surface 32 to stop the rotation of the optical fibers 14(1)-14(N) and align the optical fibers 14(1)-14(N).

With continuing reference to FIG. 5, details of the angular alignment features 20(1)-20(N) will now be provided. Cross-sections X(1)-X(N) of each of the optical fibers 14(1)-14(N) may include a planar surface 48(1)-48(N) of the angular alignment features 20(1)-20(N) respectively. The planar surface 48(1)-48(N) may be parallel to the fiber center axis $A_2(1)$-$A_2(N)$ and may extend from the first end 22 to the second end 24 of the fiber optic ribbon cable 10 (FIG. 1A) as well as from the first transition point 42(1)-42(N) to the second transition point 44(1)-44(N), respectively. The planar surface 48(1)-48(N) provides stability when the angular alignment feature 20(1)-20(N) is abutting the alignment surface 32 because the planar surface 48(1)-48(N) may be disposed closer to fiber center axis $A_2(1)$-$A_2(N)$ than the concentric portions 46(1)-46(N) as discussed above.

As shown in FIG. 5, a nominal diameter $D_1$ of each of the bare optical fibers 36(1)-36(N) may be, for example, one-hundred (100) microns. After the primary coatings 38(1)-38(N) may be applied, a nominal diameter $D_2$ of each of the optical fibers 14(1)-14(N) may be, for example, one-hundred twenty-five (125) microns. Each of the angular alignment features 20(1)-20(N) may be of a width W of at least forty (40) microns as measured in the cross-section X(1)-X(N) (FIG. 2A) which may be orthogonal to the fiber center axis $A_2(1)$-$A_2(N)$. A width W less than forty (40) microns may not enable the angular alignment features 20(1)-20(N) to align the optical fibers 14(1)-14(N) upon the alignment surface 32.

Figure 6:
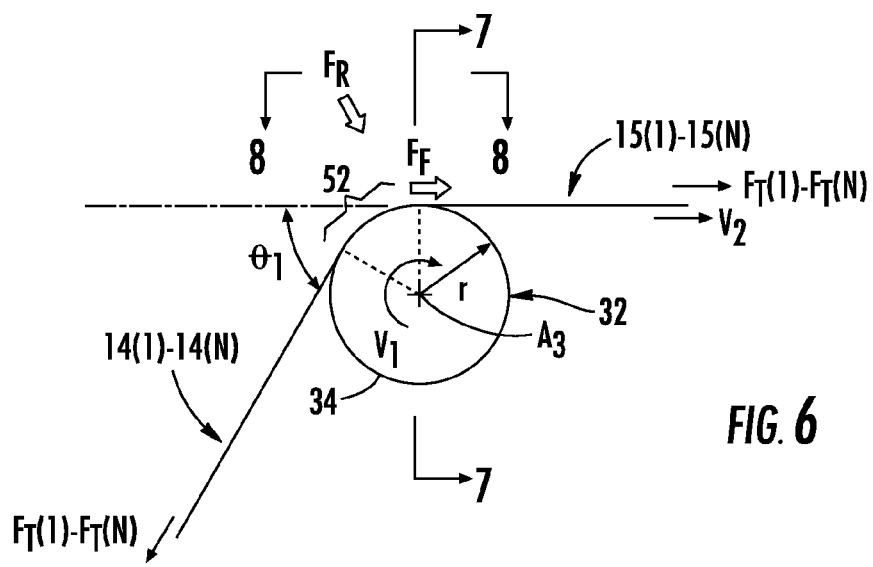
FIG. 6 is a side view of the optical fibers and their angular alignment features abutting the alignment surface of FIG. 3.
Figure 7:
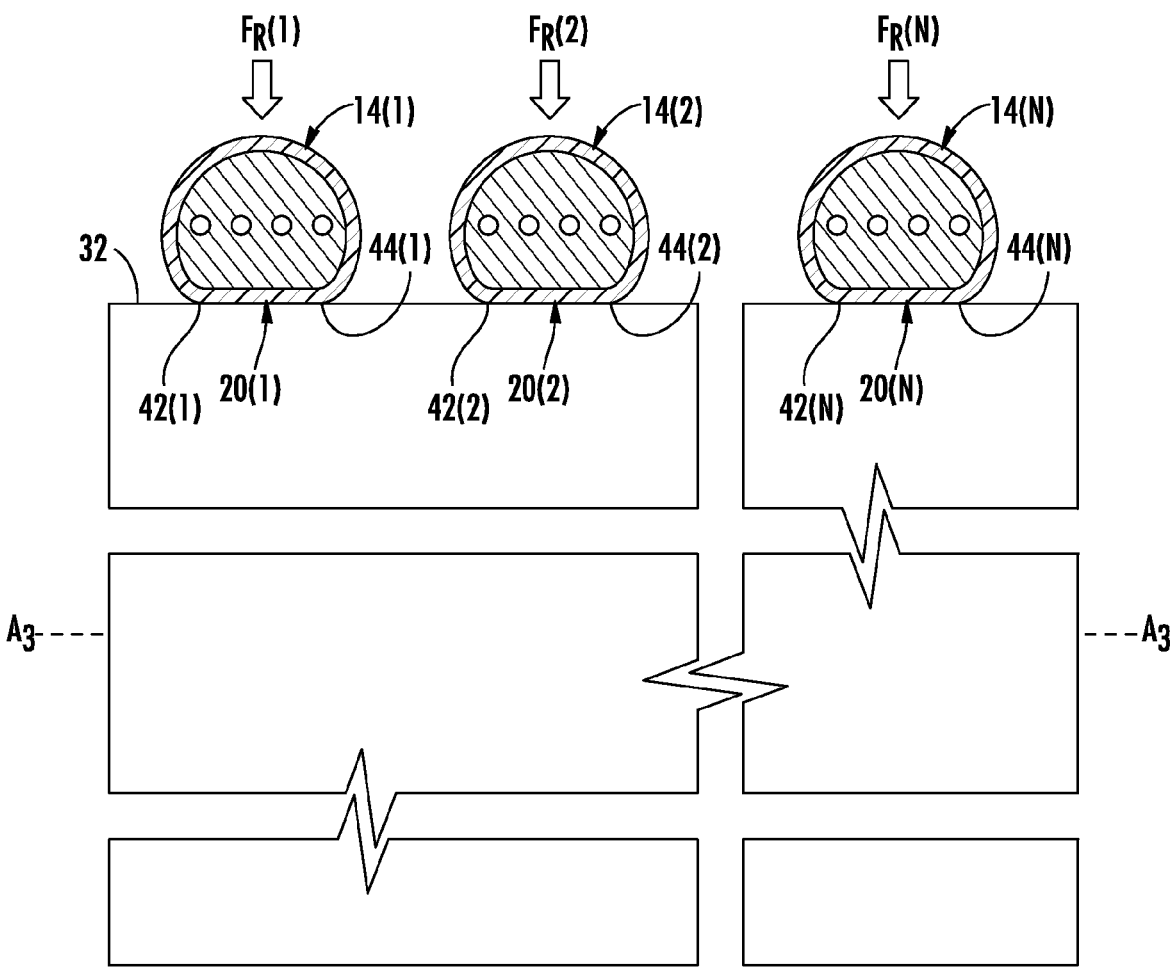
FIG. 7 is a partial cutaway view of the optical fibers of FIG. 2A and their angular alignment features abutting against the alignment surface of FIG. 3.

FIGS. 6 and 7 provide details of the alignment of the optical fibers 14(1)-14(N) upon the alignment surface 32. This alignment may provide the uniform or substantially uniform angular orientation of each of the plurality of optical fibers 14(1)-14(N) downstream of the alignment surface 32 to form the plurality of aligned optical fibers 15(1)-15(N). As shown in FIGS. 6 and 7, alignment is accomplished by utilizing the tension force $F_T(1)$-$F_T(N)$ on each of the optical fibers 14(1)-14(N) to engage each of the angular alignment features 20(1)-20(N) with the alignment surface 32. In this regard, both the first transition point 42(1)-42(N) and the second transition point 44(1)-44(N) (FIG. 5) of the angular alignment features 20(1)-20(N) may engage with the alignment surface 32 directly or through the primary coatings 38(1)-38(N). Generally, each of the optical fibers 14(1)-14(N) may maintain a constant angular orientation with respect to the alignment surface 32 as long as a sufficient amount of the tension force $F_T(1)$-$F_T(N)$ may be applied to each of the optical fibers 14(1)-14(N) to maintain both the first transition point 42(1)-42(N) and the second transition point 44(1)-44(N) in communication with the alignment surface 32.

FIGS. 6 and 7 show the relationship between the tension force $F_T(1)$-$F_T(N)$ and the force $F_R$ placed on the optical fibers 14(1)-14(N) to keep the optical fibers 14(1)-14(N) engaged with the alignment surface 32. The optical fibers 14(1)-14(N) may approach the alignment surface 32 at a theta angle $\theta_1$ (theta 1) with a tension force $F_T(1)$-$F_T(N)$, respectively. The retaining force $F_R$ applied to the optical fibers 14(1)-14(N) by the alignment surface 32 may be calculated as: $F_R(N)=2*[F_T(N)]*\sin(\text{theta angle } \theta_1/2)$, for values of the theta angle $\theta_1$ from zero (0) to up to one-hundred eighty (180) degrees. In this regard, the retaining force $F_R$ may generally be increased by elevating the tension force $F_T(N)$ and/or the theta angle $\theta_1$. The higher retaining force $F_R$ may be associated with a more uniform angular orientation because the first transition point 42(1)-42(N) and second transition point 44(1)-44(N) are pulled in a direction toward the alignment surface 32 (FIG. 6). The theta angle $\theta_1$ may be, for example, up to about one-hundred seventy (170) degrees and preferably ninety (90) degrees to optimize the retaining force $F_R$ and minimize stress on the optical fibers 14(1)-14(N).

With continuing reference to FIG. 6, a radius r (or radius of curvature) of the alignment surface 32 may also be adjusted, for example, to not damage the optical fibers 14(1)-14(N) and/or to increase local pressure of the retaining force $F_R$ on the optical fibers 14(1)-14(N). The optical fibers 14(1)-14(N) may have a minimum bend radius of curvature to prevent damage to the optical fibers 14(1)-14(N), for example, five (5) millimeters. The radius r of the alignment surface 32 may be constructed to at least be greater than the minimum bend radius of the optical fibers 14(1)-14(N). However, a larger value of the radius r of the alignment surface 32 may distribute the retaining force $F_R$ over a larger area 52 (FIG. 6) of the alignment surface 32 and thereby the retaining force $F_R$ allocated to at any one portion of the optical fibers 14(1)-14(N) may be less. The resulting consequence is that there may be generally less control of the uniformity of the angular orientation of the optical fibers 14(1)-14(N). The radius r of the alignment surface 32 may be, for example, six (6) inches.

The alignment surface 32 may or may not rotate. FIG. 6 also shows the convex surface 34 of the alignment surface 32 rotating with a rotational speed $V_1$ about a rotational axis $A_3$. The rotational speed $V_1$ may reduce the chance for damage to the optical fibers 14(1)-14(N) by reducing friction $F_F$ between the optical fibers 14(1)-14(N) and the alignment surface 32. The convex surface 34 may be concentric about the rotational axis $A_3$ to minimize disturbance of the abutment of the optical fibers 14(1)-14(N) against the alignment surface 32 as shown in FIG. 7.

Figure 8:
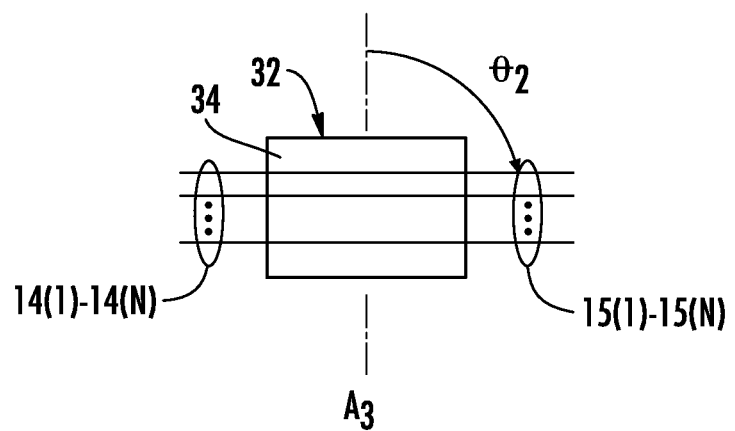
FIG. 8 is a top view of the optical fibers and their angular alignment features abutting the alignment surface of FIG. 3.

As shown in FIG. 8, the optical fibers 14(1)-14(N) may be disposed at a second theta angle $\theta_2$ with respect to the rotational axis $A_3$. The second theta angle $\theta_2$ may be preferably within five (5) degrees of orthogonal. A value of the second theta angle $\theta_2$ of ninety (90) degrees may prevent a movement of the alignment surface 32 not parallel to the center axis $A_2(1)$-$A_2(N)$ of the optical fibers 14(1)-14(N) from disengaging one or more of the angular alignment features 20(1)-20(N) from the alignment surface 32.

Figure 9:
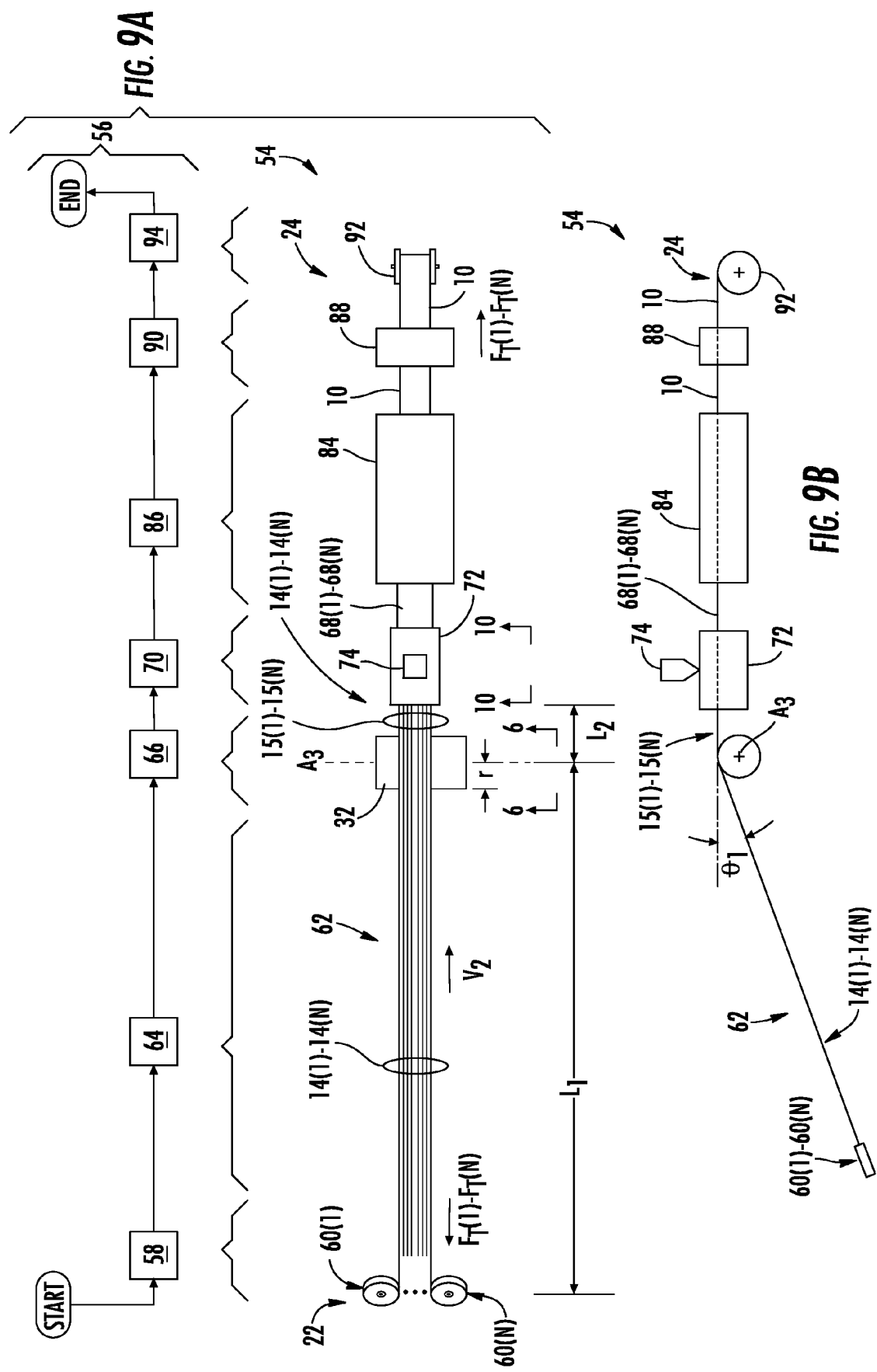
FIG. 9A is a top view of an exemplary process of aligning the optical fibers including angular alignment features to manufacture the fiber optic ribbon cable of FIG. 1A.
FIG. 9B is a side view of the exemplary production line of FIG. 9A.

FIG. 9A is a top view of an exemplary production line 54 utilizing an exemplary process 56 of aligning the optical fibers 14(1)-14(N) including the angular alignment features 20(1)-20(N) to manufacture the fiber optic ribbon cable 10. FIG. 9B further shows the exemplary production line 54 in a side view. The process 56 in FIGS. 9A and 9B will be described using the terminology and information provided above.

A first step 58 in the process 56 may be to provide the plurality of optical fibers 14(1)-14(N) (step 58 in FIG. 9A). Each of the plurality of optical fibers 14(1)-14(N) may include the angular alignment feature 20(1)-20(N), respectively. The optical fibers 14(1)-14(N) may be provided, for example, on spool-enabled devices 60(1)-60(N) adapted to pay out the optical fibers 14(1)-14(N) and maintain a tension force $F_T(1)$-$F_T(N)$ on each of the optical fibers 14(1)-14(N). The tension force $F_T(1)$-$F_T(N)$ may be, for example, in a range from one (1) to two (2) pounds applied to each of the optical fibers 14(1)-14(N). However, the tension force $F_T(1)$-$F_T(N)$ may be experimentally adjusted to meet the specific specifications of the optical fibers 14(1)-14(N) and the production line 54.

Next, the optical fibers 14(1)-14(N) may be routed through an aerial pathway 62 (FIGS. 9A-9B) to the alignment surface 32, for example, as shown in FIG. 3 (step 64 in FIG. 9A). The aerial pathway 62 (FIGS. 9A-9B) may be adapted to store angular twists of the optical fibers 14(1)-14(N) and help prevent these angular twists from traveling downstream of the alignment surface 32 by providing a location for the angular twists to be stored. A close-up image in FIG. 4A shows exemplary angular twists represented by the angular alignment features 20(1)-20(3) of optical fibers 14(1)-14(3) respectively at different angular vectors $V_1(1)$-$V_1(3)$ approaching the alignment surface 32 in FIG. 4B than when departing the alignment surface 32. The angular change of each of the optical fibers 14(1)-14(N) between FIGS. 4A and 4B are the angular twists which may be stored in the aerial pathway 62.

With reference back to FIG. 9A, in order to store these angular twists, the aerial pathway 62 includes a distance $L_1$ selected sufficiently large to be able to store an adequate quantity of angular twists, so that a torque does not build to a threshold level upstream of the alignment surface 32. Each of the optical fibers 14(1)-14(N) may perform as a torsion spring and increase torsion with every angular twist that may be stored. If the torsion stored in any of the optical fibers 14(1)-14(N) within the aerial pathway 62 exceeds the threshold level, the corresponding member of the optical fibers 14(1)-14(N) may disengage from the alignment surface 32 and the angular twists stored in the aerial pathway 62 may escape downstream of the alignment surface 32 to become embedded in the fiber optic ribbon cable 10 and thereby reduce the uniformity of the angular orientation. The length $L_1$ may be, for example, thirty (30) feet long.

It is further noted that the threshold level may be determined experimentally while considering several factors, including, for example, dimensional and material characteristics the optical fibers 14(1)-14(N), the tension force $F_T(1)$-$F_T(N)$, and material characteristics of the alignment surface 32. Further, the length $L_1$ may be reduced by better controlling twist during a manufacture of the optical fibers 14(1)-14(N).

Next, each of the plurality of optical fibers 14(1)-14(N) may be aligned with respect to the angular alignment feature 20(1)-20(N) (step 66 in FIG. 9A). The details of the alignment of the optical fibers 14(1)-14(N) against the alignment surface 32 were discussed above with respect to at least FIGS. 6-7 and is not repeated here to reduce redundancy.

Next, the ribbon matrix 16 may be applied to the aligned optical fibers 15(1)-15(N) to produce ribbonized optical fibers 68(1)-68(N) where each comprises the substantially uniform angular orientation (step 70 in FIG. 9A). The ribbon matrix 16 may be applied with a ribbon die coating head 72.

Figure 10:
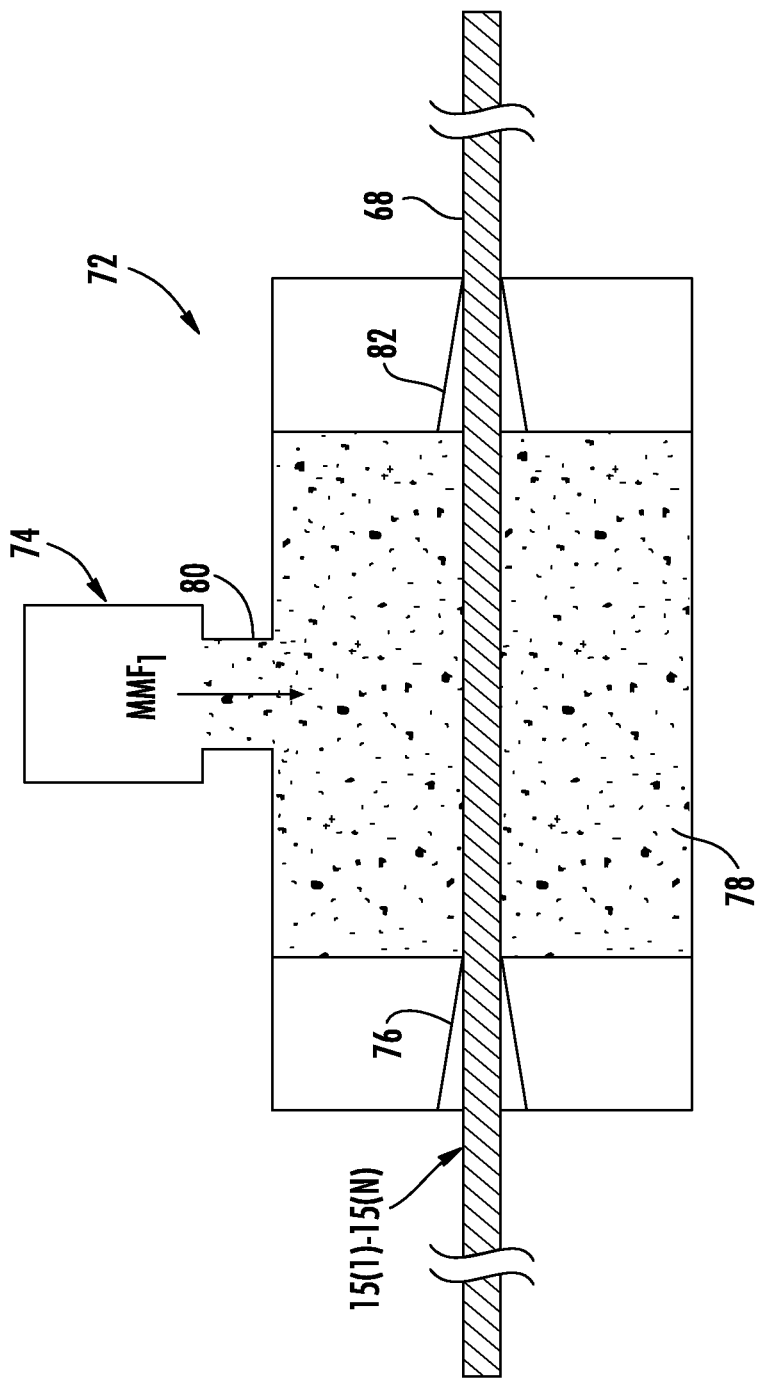
FIG. 10 is a side view of the ribbon die coating head of the process of FIGS. 9A and 9B.

FIG. 10 shows a side view of an example of the ribbon die coating head 72. The aligned optical fibers 15(1)-15(N) are routed to the ribbon die coating head 72 over a distance $L_2$ from the alignment surface 32 (FIG. 9A). The distance $L_2$ may be kept as short as possible to minimize the opportunity for the aligned optical fibers 15(1)-15(N) to change angular orientation. The length $L_2$ may be, for example, eight (8) inches as a non-limiting example.

A material supply 74 for the ribbon matrix 16 may be provided to the ribbon die coating head 72. A fiber inlet 76 of the ribbon die coating head 72 allows aligned optical fibers 15(1)-15(N) to enter a die head chamber 78. A material inlet 80 of the ribbon die coating head 72 may allow a matrix material flow $MMF_1$ from the material supply 74 to enter the die head chamber 78 from the material supply 74. An outlet 82 may be disposed so that ribbonized optical fibers 68(1)-68(N), which include the aligned optical fibers 15(1)-15(N), may exit the die head chamber 78.

With continuing reference to FIGS. 9A and 9B, next, the ribbonized optical fibers 68(1)-68(N) may then be cured to produce the fiber optic ribbon cable 10 by entering an oven 84 which may be, for example, an ultra-violet (UV) curing oven (step 86 in FIG. 9A). It is noted that the oven 84 may not be required if materials utilized for the ribbon matrix 16 do not require the oven 84. Also it is noted that the oven 84 may be formed integral with the ribbon die coating head 72.

Next, the fiber optic ribbon cable 10 may be then sent to a marking device 88 (step 90 in FIG. 9A). The marking device 88 may be used to add identification markings to the fiber optic ribbon cable 10. Next, the fiber optic ribbon cable 10 may be then wound onto a take up reel 92 (step 94 in FIG. 9A). The take up reel 92 may be used to transport the fiber optic ribbon cable 10 to a facility for connectorization where passive alignment may occur with the ferrule 12.

The fiber optic ribbon cable 10 may be produced with the exemplary process 56 provided above. The fiber optic ribbon cable 10 may include the plurality of optical fibers 14(1)-14(N). Each of optical fibers 14(1)-14(N) may include the first end 22 and the second end 24. Each of the optical fibers 14(1)-14(N) may also include the angular alignment feature 20(1)-20(N), respectively, extending from the first end 22(1)-22(N) to the second end 24(1)-24(N). The angular alignment features 20(1)-20(N) may be formed as the portion of the bare optical fibers 36(1)-36(N) of the optical fibers 14(1)-14(N). The fiber optic ribbon cable 10 may also include the ribbon matrix 16 attached to each of the optical fibers 14(1)-14(N) with the ribbon die coating head 72. The ribbon matrix 16 may be attached after each of the optical fibers 14(1)-14(N) may be aligned by abutting against the alignment surface 32. The ribbon matrix 16 may extend from the first end 22 of the optical fibers 14(1)-14(N) to the second end 24. Each of the optical fibers 14(1)-14(N) may be disposed with a substantially uniform angular orientation of the angular alignment features 20(1)-20(N) from the first end 22 to the second end 24.

Figure 11:
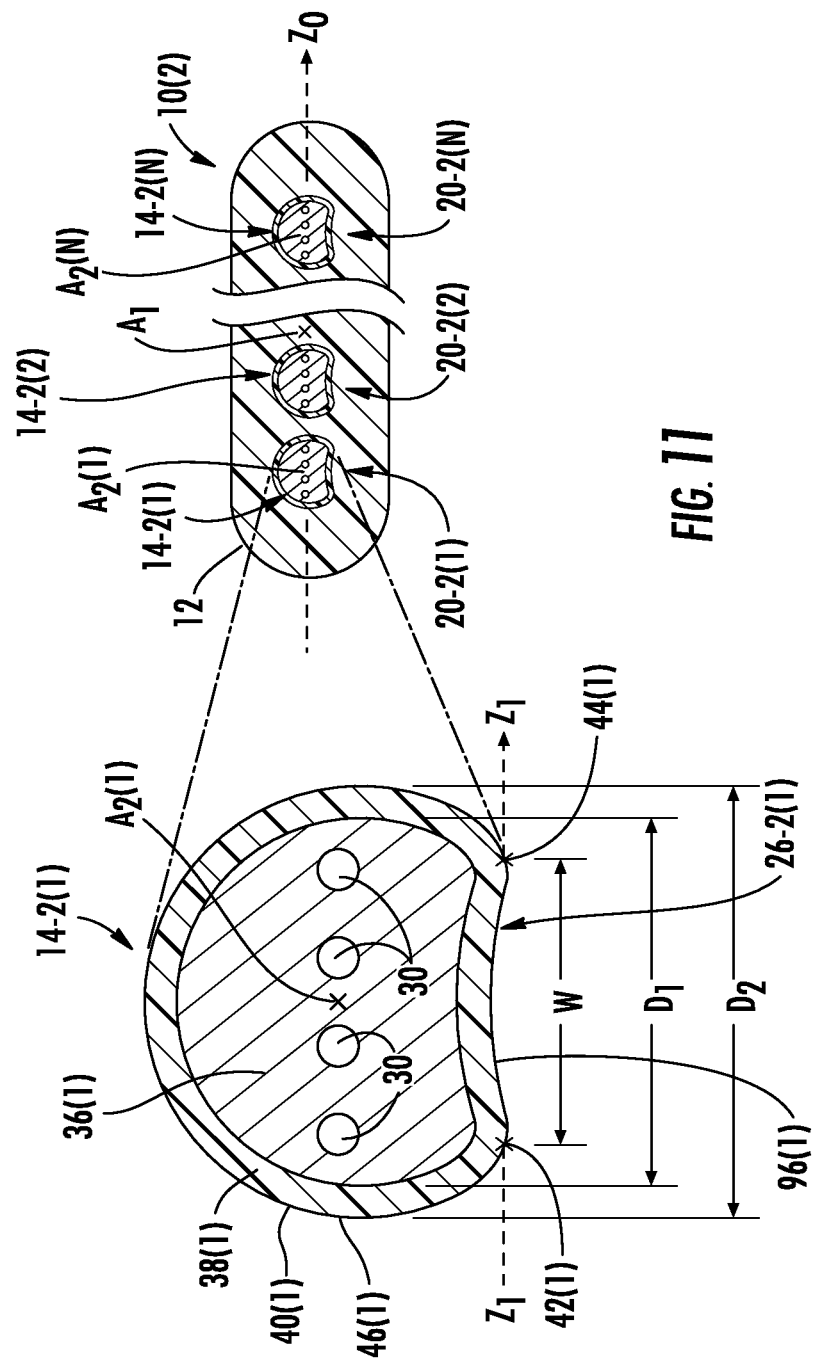
FIG. 11 is a cross-sectional view of an alternative embodiment of a fiber optic ribbon cable comprising optical fibers having angular alignment features including concave surfaces.

FIG. 11 shows a second embodiment of the optical fiber 14-2(1)-14-2(N) of a fiber optic ribbon cable 10(2). One or more of the optical fibers 14-2(1)-14-2(N) may include angular alignment features 20-2(1)-20-2(N) comprising a concave surface 96(1)-96(N). The concave surface 96(1)-96(N) may be configured to be aligned parallel to fiber center axes $A_2(1)$-$A_2(N)$ respectively. All other characteristics of the optical fibers 14-2(1)-14-2(N) may be similar to those of the optical fibers 14(1)-14(N) discussed earlier in association with FIG. 5 and will not be repeated for conciseness and to reduce redundancy. The concave surface 96(1)-96(N) may be connected to a remainder of the external surface 40(1)-40(N) at the first transition point 42(1)-42(N) and the second transition point 44(1)-44(N). The first transition point 42(1)-42(N) and the second transition point 44(1)-44(N) together may permit a more robust alignment because an abutment between the angular alignment feature 20-2(1)-20-2(N) and the alignment surface 32 may be limited to the first transition point 42(1)-42(N) and the second transition point 44(1)-44(N). Thereby surface imperfections of the angular alignment feature 20-2(1)-20-2(N) between the first transition point 42(1)-42(N) and the second transition point 44(1)-44(N) may be avoided.

Lastly, terminology regarding alignment of the optical fibers 14(1)-14(N) within the fiber optic ribbon cable 10 is discussed. Alignment of the optical fibers 14(1)-14(N) within the fiber optic ribbon cable 10 is a measurable characteristic. Uniform angular orientation exists for the purposes of this disclosure when none of the optical fibers 14(1)-14(N) twist along their path between the first end 22 and the second end 24 of the fiber optic ribbon cable 10. This measurable characteristic excludes twisting of the optical fibers 14(1)-14(N) attributable to the fiber optic ribbon cable 10 not being extended straight. Specifically, uniform angular orientation exists where an angular relationship between a datum angular vector $Z_0$ and the angular vector $Z_1$ of any cross-section X(1)-X(N) remains unchanged relative to any other random cross-sections X(1)-X(N) between the first end 22 and the second end 24 (FIG. 2A). The datum angular vector $Z_0$ may be analogous to a datum and may be defined as intersecting any two of the fiber center axes $A_2(1)$-$A_2(N)$. For example, in FIG. 2B a vector $Z_0$ is defined as intersecting the fiber center axis $A_2(1)$ and extending to the fiber axis $A_2(N)$. When determining uniform orientation between different ones of the cross-sections X(1)-X(N), the same selected members of the fiber center axes $A_2(1)$-$A_2(N)$ are used in order to establish a standard datum.

The angular vector $Z_1$ may be defined as extending from the first transition point 42(1)-42(N) of the optical fiber 14(1)-14(N) of interest to the second transition point 44(1)-44(N) of the same optical fiber 14(1)-14(N) of interest. As long as the angular relationship (or angle) between the datum angular vector $Z_0$ and the angular vector $Z_1$ is the same for a given cross-section X(1) compared to all cross-sections X(2)-X(N) between the first end 22 and the second end 24 for the optical fiber 14(N) of the optical fibers 14(1)-14(N), then there is uniform angular orientation for that optical fiber 14(N). Substantial uniform angular orientation occurs for the fiber optic ribbon cable 10 when the angular orientation for all of the optical fibers 14(1)-14(N) are analyzed individually and the maximum angular difference between the datum angular vector $Z_0$ and the angular vector $Z_1$ is, for example, less than ten (10) degrees, or preferably less than one (1) degree.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning, Incorporated of Corning, N.Y. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments disclosed herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic ribbon cable, comprising:
   a plurality of optical fibers including a first end and a second end; and
   a ribbon matrix attached to each of the plurality of optical fibers, the ribbon matrix extending from the first end to the second end,
   wherein each of the plurality of optical fibers includes an angular alignment feature extending from the first end to the second end, each of the plurality of optical fibers is disposed with a uniform or substantially uniform angular orientation of the angular alignment features from the first end to the second end, wherein the angular orientation for the plurality of optical fibers analyzed individually has a maximum angular difference between a datum angular vector $Z_0$ and an angular vector $Z_1$ is less than ten degrees.

2. The fiber optic ribbon cable of claim 1, wherein each of the plurality of optical fibers comprises a bare optical fiber and a coating surrounding the bare optical fiber to form an external surface of the optical fiber, the external surface includes the angular alignment feature.

3. The fiber optic ribbon cable of claim 1, wherein a cross-section of each of the plurality of optical fibers includes a planar surface of the angular alignment feature.

4. The fiber optic ribbon cable of claim 1, wherein the angular alignment feature includes a width of at least forty (40) microns in a cross-section.

5. The fiber optic ribbon cable of claim 1, wherein a cross-section of each of the plurality of optical fibers comprises a concave surface of the angular alignment feature, the concave surface is configured to be aligned parallel to a fiber center axis, the cross-section is orthogonal to the fiber center axis.

6. The fiber optic ribbon cable of claim 3, wherein the planar surface is parallel to a fiber center axis, and the cross-section is orthogonal to the fiber center axis.

7. The fiber optic ribbon cable of claim 1, wherein a cross-section of the fiber optic cable includes a portion of each of the plurality of optical fibers, and the portion of each of the optical fibers is disposed in a geometric line within the cross-section.

8. The fiber optic ribbon cable of claim 2, wherein the angular alignment features of the plurality of optical fibers are configured to be passively aligned with a ferrule.

9. The fiber optic ribbon cable of claim 1, wherein each of the plurality of optical fibers comprises a multicore optical fiber including at least two cores, each of the at least two cores configured to accommodate different optical paths.

10. A method for manufacturing a fiber optic ribbon cable, comprising:
    providing a plurality of optical fibers, each of the plurality of optical fibers including an angular alignment feature extending from a first end of the plurality of optical fibers to a second end of the plurality of optical fibers;
    aligning each of the plurality of optical fibers with respect to the angular alignment feature to provide a uniform or substantially uniform angular orientation of each of the plurality of optical fibers downstream of a convex alignment surface to form a plurality of aligned optical fibers, wherein the aligning each of the plurality of optical fibers comprises abutting the angular alignment feature of each of the plurality of optical fibers against the convex alignment surface; and
    applying a ribbon matrix to the plurality of aligned optical fibers to produce a plurality of ribbonized optical fibers each comprising the substantially uniform angular orientation, wherein the angular orientation for the plurality of optical fibers analyzed individually has a maximum angular difference between a datum angular vector $Z_0$ and an angular vector $Z_1$ is less than ten degrees.

11. The method of claim 10, wherein the providing the plurality of optical fibers comprises providing the plurality of optical fibers each with the angular alignment feature.

12. The method of claim 10, wherein the convex alignment surface rotates about an axis.

13. The method of claim 12, wherein the convex alignment surface rotates about the axis according to friction between the plurality of optical fibers and the alignment surface.

14. The method of claim 12, wherein the convex alignment surface comprises a concentric surface about the axis, and each of the plurality of optical fibers approaches the alignment surface at an angle up to one-hundred seventy (170) degrees relative to an angle that the plurality of optical fibers departs the alignment surface.

15. The method of claim 10, wherein each of the plurality of optical fibers comprises a multicore optical fiber including at least two cores, each of the at least two cores configured to accommodate different optical paths.

16. The method of claim 10, further comprising applying a tension force within a range from one (1) to two (2) pounds applied to each of the plurality of optical fibers.

17. The method of claim 10, wherein the angular alignment features of the plurality of optical fibers are configured to be passively aligned with a ferrule.

18. A fiber optic ribbon cable, comprising:
    a plurality of optical fibers and each includes a first end and a second end, each of the plurality of optical fibers includes an angular alignment feature extending from the first end to the second end, the angular alignment features formed as a portion of an external surface of the plurality of optical fibers; and
    a ribbon matrix attached to each of the plurality of optical fibers with a ribbon die coating head after each of the plurality of optical fibers is aligned by abutting against a rotating alignment surface, the ribbon matrix extending from the first end of the optical fibers to the second end,
    wherein each of the plurality of optical fibers is disposed with a substantially uniform angular orientation of the angular alignment features from the first end to the second end, wherein the angular orientation for the plurality of optical fibers analyzed individually has a maximum angular difference between a datum angular vector $Z_0$ and an angular vector $Z_1$ is less than ten degrees.

19. The fiber optic ribbon cable of claim 18, wherein each of the plurality of optical fibers comprises a multicore optical fiber including at least two cores, each of the at least two cores configured to accommodate different optical paths.

* * * * *